July 5, 1966     T. A. BADEN ETAL     3,258,960
RESTRICTION INDICATOR FOR AIR CLEANERS
Filed June 13, 1963     2 Sheets-Sheet 1
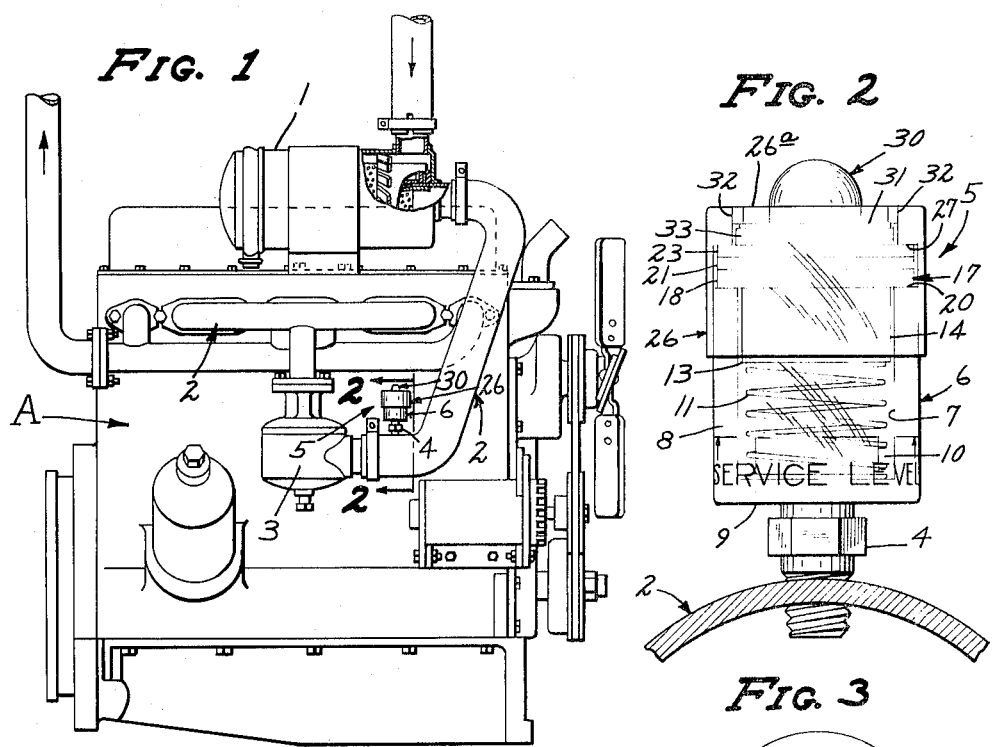
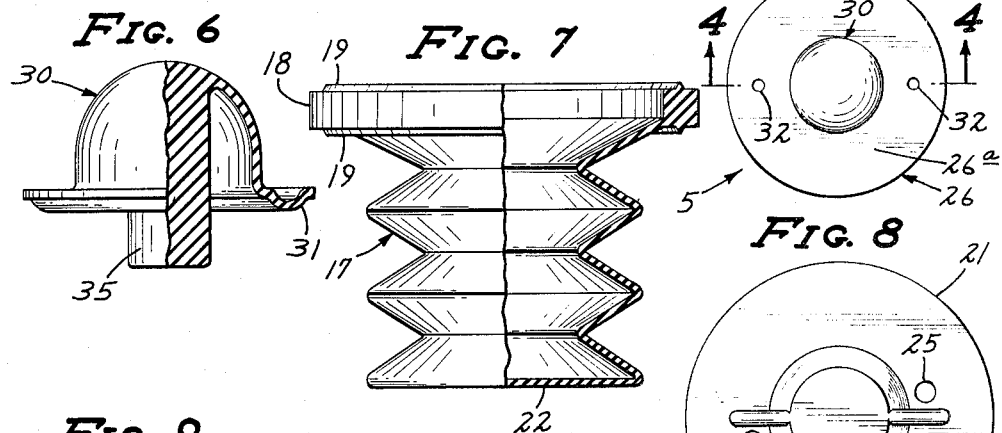
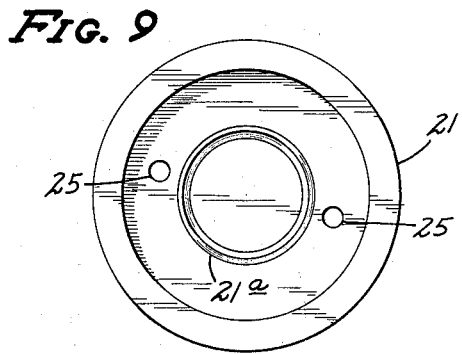
INVENTORS.
THOMAS A. BADEN
STUART J. LEE
BY
Merchant, Merchant & Gould
ATTORNEYS July 5, 1966  T. A. BADEN ETAL  3,258,960
RESTRICTION INDICATOR FOR AIR CLEANERS
Filed June 13, 1963  2 Sheets-Sheet 2
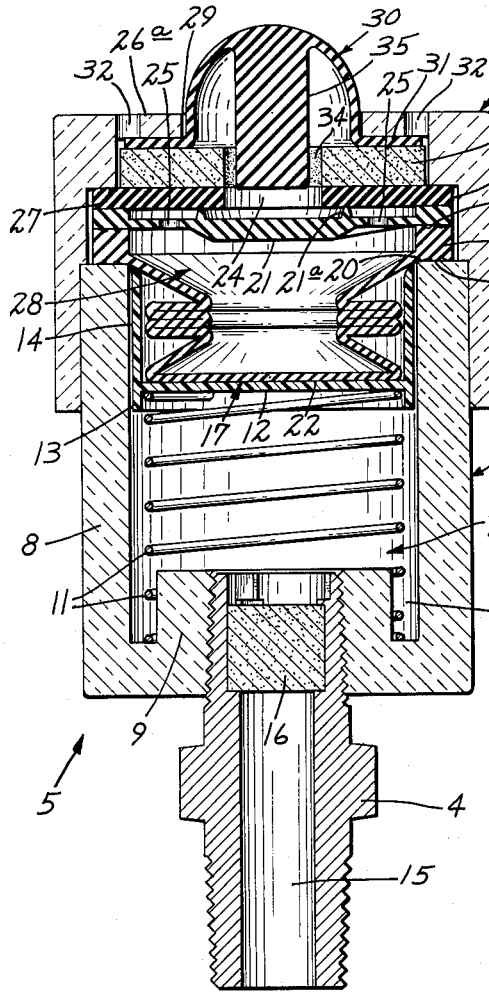
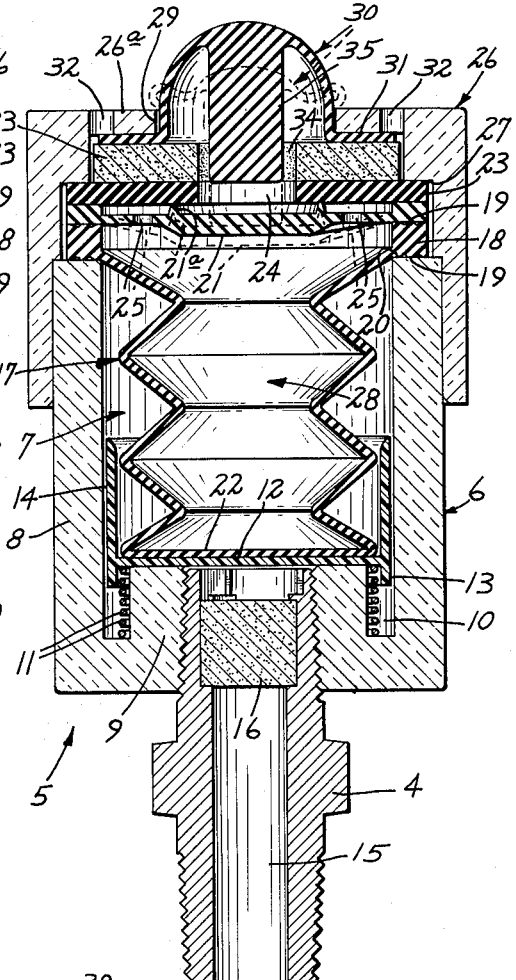
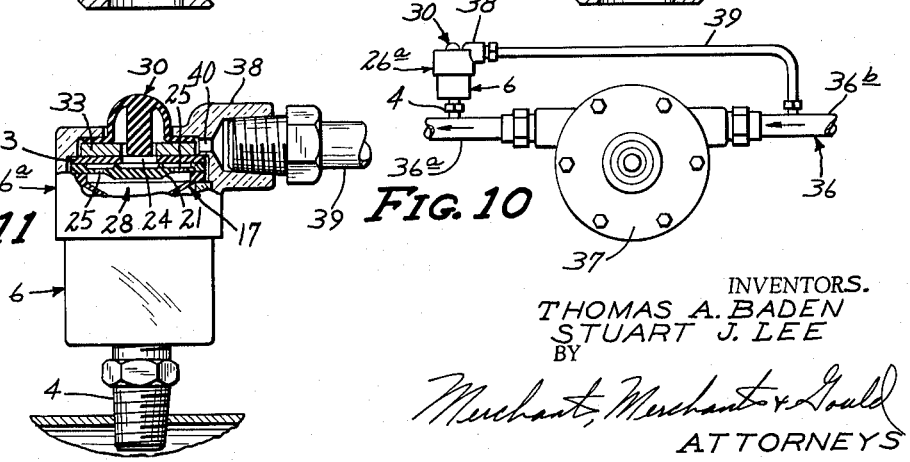
INVENTORS.
THOMAS A. BADEN
STUART J. LEE
BY
Merchant, Merchant & Gould
ATTORNEYS

United States Patent Office 3,258,960
Patented July 5, 1966

3,258,960
RESTRICTION INDICATOR FOR AIR CLEANERS
Thomas A. Baden and Stuart J. Lee, Minneapolis, Minn.,
assignors to Donaldson Company, Inc., Minneapolis,
Minn., a corporation of Delaware
Filed June 13, 1963, Ser. No. 287,714
2 Claims. (Cl. 73—118)

Our invention relates generally to pressure drop indicators of the type adapted to be interposed between two areas of pressure.

While our device has, as above indicated general use, for the purpose of illustration we have shown same in use in connection with an internal combustion engine wherein same is interposed in the manifold between the air cleaner and the carburetor to indicate pressure drop brought about by progressive restriction due to the ever-growing amount of dirt and other foreign matter extracted from the air as it passes through the filter. For the purpose of determining at a glance the degree of restriction or pressure drop so as to determine the need for replacement of the filtering element, visible indicator means is usually provided.

The primary object of our invention is the provision of a restriction indicator of the class above described which incorporates a minimum of working parts and which is foolproof in its operation.

A further object of our invention is the provision of a device of the class described which may be manufactured at a minimum of cost, which is extremely light in weight and consequently may be shipped at a minimum of cost.

A still further object of our invention is the provision of a device of the class described wherein the air passing therethrough either from the high pressure or low pressure side is completely filtered so that the efficiency of the working parts is never impaired and the visibility of the filter-change indicator is not affected.

The above and still further objects of our invention will become apparent from the following detailed specification, appended claims and attached drawings.

Referring to the drawings, wherein like characters indicate like parts throughout the several views, and initially to FIGS. 1 to 9, inclusive, wherein we show our novel indicator in use in connection with an internal combustion engine:

FIG. 1 is a view in side elevation of an internal combustion engine showing our novel air restriction indicator secured to the manifold thereof;

FIG. 2 is an enlarged view in section taken substantially on the line 2—2 of FIG. 1;

FIG. 3 is a top plan of the structure shown in FIG. 2;

FIG. 4 is an enlarged view in axial section taken on the line 4—4 of FIG. 3;

FIG. 5 is a view corresponding to FIG. 4 but showing a different position of some of the parts;

FIG. 6 is a view in side elevation of the operating button of our novel structure, some parts being broken away and shown in section;

FIG. 7 is a view of the diaphragm of our novel structure, some parts being broken away and shown in section;

FIG. 8 is a view in bottom plan of the check valve utilized in our novel structure;

FIG. 9 is a view in top plan of the structure shown in FIG. 8;

FIG. 10 is a diagrammatic view illustrating a slightly modified form of our invention and use thereof; and FIG. 11 is a slightly enlarged view in elevation of the structure shown in FIG. 10, some parts thereof being broken away.

Referring with greater particularity to the drawings, the letter A identifies in its entirety a conventional internal combustion engine of the reciprocating piston type having a conventional air filter or cleaner 1 operatively connected to the cylinders, not specifically identified, through the medium of a manifold indicated in its entirety by the numeral 2 and in which a carburetor 3 is interposed. Shown as being secured to the manifold 2 and connected to the interior thereof through the medium of a tubular connector 4 is our novel restriction indicator, identified in its entirety by 5. Structure 5 includes a cup-like housing 6 which defines a generally cylindrical primary chamber 7. Housing 6 is formed from any suitable transparent material, preferably plastic such as Lucite, so as to provide a transparent wall portion 8. As shown, the tubular conduit or connector 4 extends axially into the primary chamber 7 through end wall 9, which is formed to define an axially inwardly opening annular recess 10 concentric with said conduit 4. A coil compression spring 11 is shown as having one end received within said recess 10, the upper end of said spring 11 abutting against a disc-like piston 12, the same being centered with respect thereto by means of an axially outwardly extended cup-forming wall 13 formed integrally with said piston 12. Piston 12 has an axially inwardly extended cup-forming wall 14 which, for a purpose hereinafter to be explained in detail, is preferably colored so as to be visible through the transparent wall portion 8 when caused to occupy the position of FIG. 5. It will be noted that the passage 15 defined by the tubular connector 4 has interposed therein a porous filtering element 16 which obviously can be formed of any suitable material, such as sintered bronze, and the function of which is to exclude dirt and other foreign matter from the primary chamber 7 from any air entering thereinto from the manifold 2.

Identified in its entirety by 17 is a bellows-type diaphragm formed from rubber-like material and having an annular anchoring flange 18. Anchoring flange 18, preferably having axially projecting integrally formed sealing ribs 19 thereon, is interposed between the shoulder 20 formed by the axially inner end of the housing 6 and an overlying disc-like flexible valve element 21. The free end 22 of the diaphragm 17 is received within the recess formed by the axially inwardly extending cup-forming wall 14 during axial extending and collapsing movements, in engagement with piston 12. Immediately overlying the valve element 21 is an annular valve seat 23, the central aperture thereof being identified by 24. Valve element 21 is provided with an annular sealing rib 21a which is normally yieldingly biased into sealing engagement with the valve seat 23 by virtue of the inherent flexibility of the material from which the valve element 21 is formed. Radially outwardly of the sealing rib 21a the valve element 21 is formed to define a plurality of circumferentially spaced ports 25.

Partially closing the opposite end of the housing 6 is a cap 26 having an annular axially inwardly facing shoulder 27 which rests upon the peripheral edge of the valve seat 23. Shoulder 27 engages the valve seat 23 with sufficient force to cause sealing engagement therebetween and the valve element 21, the flange 18 and the shoulder 20.

Cap 26 and its end wall 26a cooperate with the bellows 17 to define a secondary chamber 28. As shown, the end wall 26a is formed to define an axial opening 29 through which projects axially a resilient generally hollow operating button 30 formed from rubber-like material. Button 30 is formed to define a radially outwardly projecting annular sealing flange 31 which has sealing engagement with the end wall 26a adjacent said opening 29 therein. Radially outwardly of the axial opening 29, end wall 26a is formed to define a plurality of circumferentially spaced breather ports 32 which communicate with the aperture 24 in the valve seat 23 through an annular filter 33, the central opening of which is identified by 34 and which opening 34 is in alignment with said opening 24. The annular filter 33 is interposed between the sealing flange 31 and the valve seat 23 and has sealing engagement with each thereof. In this manner air entering the secondary chamber 28 through the breather ports 32 is forced to pass through the filter 33.

As shown, the operating button 30 is formed to define an axially inwardly projecting plunger 35 which normally projects through the opening 34 in the filter 33 and is projectable through the opening 24 in the valve seat 23, whereby to engage the flexible valve element 21 and cause unseating of the sealing rib 21a thereof, as indicated by dotted lines in FIG. 5.

*Operation*

When a predetermined degree of restriction is built up within the air cleaner 1, due to accumulating dirt and other foreign matter removed from air passing therethrough, the higher pressure within the secondary chamber 28 causes extension of the diaphragm 17 against the yielding bias of the spring 11, as shown in FIG. 5. Obviously as the diaphragm 17 is extended, air from the atmosphere enters the secondary chamber 28 through breather ports 32, the filter 33, the passage 24 in the valve seat 23 and finally the ports 25 in the valve element 21, as the flexible valve 21 is deformed inwardly sufficiently to unseat the sealing rib 21a from the valve seat 23. Air is prevented escaping from the secondary chamber 28 by means of reseating of the ribs 21a upon the valve seat 23. Consequently the diaphragm 17 and the piston 12 are retained in their extended positions wherein the colored wall 14 carried by said piston 12 is visible through the transparent wall portion 8. Maximum extension of the diaphragm 17 indicates that the cleaner 1 is in condition for replacement or cleaning of the filter cartridge and the exterior of the transparent wall portion 8 may be marked to indicate such maximum extension, as shown in FIG. 2.

After the air cleaner 1 has been treated so as to remove the objectionable restriction offered thereby, it is but necessary to depress the operating button to the dotted line position of FIG. 5 whereby to permit escape of the trapped air within the secondary chamber 28 to atmosphere again through the ports 25 in the valve element 21, the aperture 24 in the valve seat 23 and the breather ports 32, as the valve element 21 is deformed by the plunger 35 to unseat the sealing ribs 21a from the valve seat 23. As this transpires the spring 11 again moves the piston 12 and the diaphragm 17 to the retracted position of FIG. 4.

In FIGS. 10 and 11 wherein a slightly modified form of the invention is shown as interposed between two pressure areas, neither of which are atmospheric, portions which correspond to like portions of the structure of FIGS. 1 to 9, inclusive, are similarly identified. Thus, the tubular connector 4 is shown as being connected directly to a conduit 36 on the suction side 36a of a filter 37.

As shown particularly in FIG. 11, cap 26a is formed to define a radially outwardly extending tubular boss 38 having a tubular conduit 39 associated therewith for connection to the pessure side 36b of the conduit 36. Obviously, with this arrangement, should an undesirable pressure differential occur due to abnormal restriction, this will be indicated by our novel indicator as the increased pressure is transmitted through the conduit 39, the tubular boss 38 and port 40 to the chamber, 28 through filter element 33 and aperture 24, and finally through ports 25 as the check valve 21 is depressed, as previously explained.

Our invention has been thoroughly tested and found to be completely satisfactory for the accomplishment of the above objects, and while we have shown a preferred embodiment thereof, we wish it to be understood that the same may be capable of modification without departure from the scope and spirit of the appended claims.

What is claimed is:

1. In a gauge for registering increasing suction in an air intake manifold,
   (a) a housing defining a generally cylindrical primary chamber having a transparent wall portion,
   (b) a tubular conduit for connecting one end of said housing to a manifold in a manner to cause communication between the interior of said manifold and said primary chamber,
   (c) an axially extendable and collapsible bellows-type diaphragm mounted in said housing for extending and retracting movements of the free end thereof into and out of that portion of said primary chamber defined by said transparent wall portion,
   (d) closure means for said other end of said housing and defining with said diaphragm a secondary chamber within said primary chamber,
   (e) means yieldingly biasing said diaphragm toward a collapsed position away from said one end,
   (f) check valve means permitting passage of atmospheric pressure to said secondary chamber when subatmospheric pressure of a predetermined value exists within said primary chamber whereby to extend said diaphragm against the bias of said yielding means,
   (g) and means for manually rendering said check valve means inoperative whereby to permit collapsing of said diaphragm under the bias of said yielding means,
   (h) said closure means for the other end of said housing comprising a cap having an axial opening therein and a breather port radially spaced with respect to said opening,
   (i) said check valve means comprising:
      (1) an annular valve seat the central opening of which is concentric with the opening in said cap,
      (2) and a flexible valve element interposed between said valve seat and said diaphragm,
   (j) said valve element having an annular sealing rib normally biased into sealing engagement with said valve seat radially outwardly of the opening therein and port means radially outwardly of said sealing rib,
   (k) said means for manually rendering said check valve means inoperative comprising a flexible resilient generally hollow button projecting axially outward through the opening in the cap and having sealing engagement with said cap adjacent said opening,
   (l) said button being provided with an axially inwardly projecting plunger which is adapted to project through the opening in said valve seat and engage said valve element sufficiently to cause disengagement of said sealing rib from said seat upon axial movement being imparted to said button whereby to permit passage of gas within said secondary chamber through the port means in said valve to atmosphere through the central opening in said valve seat and the breather port in said cap.

2. The structure defined in claim 1 in which said cap is provided with circumferentially spaced breather ports radially outwardly of the opening therein, and in further combination with an annular filter element interposed between said cap and said valve seat and so positioned as to require air entering said secondary chamber to pass therethrough.

References Cited by the Examiner

UNITED STATES PATENTS

| | | | |
|---|---|---|---|
| 2,620,656 | 12/1952 | Peterson | 73—116 |
| 2,862,648 | 12/1958 | Cooksley et al. | 251—335 X |
| 2,948,151 | 8/1960 | Astl | 73—406 |
| 3,066,527 | 12/1962 | Stein | 73—406 X |
| 3,124,960 | 3/1964 | Clark | 73—396 X |

RICHARD C. QUEISSER, *Primary Examiner.*

JERRY W. MYRACLE, *Assistant Examiner.*